(12) United States Patent
Miyazaki

(10) Patent No.: US 7,393,902 B2
(45) Date of Patent: *Jul. 1, 2008

(54) RUBBER COMPOSITION FOR BASE TREAD AND TIRE COMPRISING THE SAME

(75) Inventor: Tatsuya Miyazaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 290 days.

This patent is subject to a terminal disclaimer.

(21) Appl. No.: 11/225,212

(22) Filed: Sep. 14, 2005

(65) Prior Publication Data

US 2006/0094825 A1    May 4, 2006

(30) Foreign Application Priority Data

Oct. 28, 2004    (JP)    ............... 2004-314351

(51) Int. Cl.
*C08L 9/00* (2006.01)
(52) U.S. Cl. .................. 525/236; 525/237; 525/331.9
(58) Field of Classification Search .................. 525/236, 525/237, 331.9
See application file for complete search history.

(56) References Cited

U.S. PATENT DOCUMENTS

| 5,131,445 | A | 7/1992 | Tokieda et al. |
| 5,753,365 | A | 5/1998 | Morimoto et al. |
| 6,378,582 | B1 * | 4/2002 | Sandstrom et al. ....... 152/209.1 |
| 6,512,035 | B1 * | 1/2003 | Hergenrother et al. ...... 524/262 |

FOREIGN PATENT DOCUMENTS

| EP | 1 241 219 A1 | 9/2002 |
| JP | 63-77953 A | 4/1988 |
| JP | 6-322185 A | 11/1994 |
| JP | 11-349732 A | 12/1999 |
| JP | 2004-114878 A | 4/2004 |
| WO | WO-02/066554 A1 | 8/2002 |

* cited by examiner

*Primary Examiner*—Randy Gulakowski
*Assistant Examiner*—Olga Asinovsky
(74) *Attorney, Agent, or Firm*—Birch, Stewart, Kolasch & Birch, LLP

(57) ABSTRACT

A rubber composition for a base tread which achieves improved steering stability and rolling resistance properties and a tire containing the same wherein the rubber composition includes a rubber component containing (a) 20 to 60% by weight of a polybutadiene rubber containing 2.5 to 20% by weight of a 1,2-syndiotactic polybutadiene crystal, (b) 5 to 80% by weight of a tin-modified polybutadiene rubber polymerized by a lithium initiator, in which the amount of a tin atom is 50 to 3000 ppm, the amount of a vinyl bond is 5 to 50% by weight and molecular weight distribution (Mw/Mn) is at most 2, and (c) 10 to 75% by weight of a rubber other than (a) and (b).

4 Claims, No Drawings

RUBBER COMPOSITION FOR BASE TREAD AND TIRE COMPRISING THE SAME

BACKGROUND OF THE INVENTION

The present invention relates to a rubber composition for a base tread and a tire comprising the same.

Recently, for the purpose of energy saving, various means have been applied to reducing rolling resistance of a tire (for improving rolling resistance properties) or improving steering stability of a car. An example of the means is using a rubber composition exhibiting excellent rolling resistance properties and steering stability at an inner side layer of a base tread which has two layer structure (an inner layer and a surface layer).

A rubber composition for a tire containing a polybutadiene rubber having 1 to 25% of a 1,2-syndiotactic polybutadiene crystal as a rubber component is disclosed in the Japanese Unexamined Patent Publication No. 11-349732, but if the rubber composition is used as a base tread, there has been a problem that both of steering properties mainly related to rigidity and tan δ related to rolling resistance can not be satisfied.

SUMMARY OF THE INVENTION

It is an object of the present invention to provide a rubber composition for a base tread improving steering stability and rolling resistance properties, and a tire comprising the same.

The present invention relates to a rubber composition for a base tread comprising a rubber component containing (a) 20 to 60% by weight of a polybutadiene rubber containing 2.5 to 20% by weight of a 1,2-syndiotactic polybutadiene crystal, (b) 5 to 80% by weight of a tin-modified polybutadiene rubber polymerized by a lithium initiator, in which the amount of a tin atom is 50 to 3000 ppm, the amount of a vinyl bond is 5 to 50% by weight and molecular weight distribution (Mw/Mn) is at most 2, and (c) 10 to 75% by weight of a rubber other than rubber (a) and rubber (b).

Also, the present invention relates to a tire having a base tread comprising the rubber composition for a base tread.

DETAILED DESCRIPTION

The rubber composition for a base tread of the present invention comprises a rubber component containing (a) a polybutadiene rubber containing a 1,2-syndiotactic polybutadiene crystal, (b) a tin-modified polybutadiene rubber, and (c) a rubber other than (a) and (b).

In the polybutadiene rubber containing a 1,2-syndiotactic polybutadiene crystal (a) (BR(a)), the 1,2-syndiotactic polybutadiene crystal is not merely dispersed in BR(a), but it is chemically bonded with BR(a) and preferably dispersed in no orientation. Since the above described crystal is chemically bonded with a rubber component and then the compound is dispersed, generation and diffusion of cracks tend to be suppressed.

The melting point of the 1,2-syndiotactic polybutadiene crystal is preferably at least 180° C. and more preferably at least 190° C. When the melting point is less than 180° C., crystals are melted during curing of a tire by press and hardness tends to be lowered. Further, the melting point of the 1,2-syndiotactic polybutadiene crystal is preferably at most 220° C. and more preferably at most 210° C. When the melting point exceeds 220° C., molecular weight of BR(a) becomes high; therefore dispersibility in the rubber composition tends to be poor.

In BR(a), the amount of an portion insoluble in boiling n-hexane is preferably at least 2.5% by weight and more preferably at least 8% by weight. When the amount is less than 2.5% by weight, sufficient hardness of a rubber composition tends not to be obtained. Also, the amount of the portion insoluble in boiling n-hexane is preferably at most 22% by weight, more preferably at most 20% by weight and further preferably at most 18% by weight. When the amount exceeds 22% by weight, viscosity of BR(a) itself is high and dispersibility of BR(a) and a filler in the rubber composition tends to be deteriorated. Herein, the portion insoluble in boiling n-hexane indicates 1,2-syndiotactic polybutadiene (SPBD) in BR(a).

The amount of the 1,2-syndiotactic polybutadiene crystal is at least 2.5% by weight and preferably at least 10% by weight in BR(a). When the amount is less than 2.5% by weight, hardness is insufficient. Also, the amount of the 1,2-syndiotactic polybutadiene crystal is at most 20% by weight in BR(a) and preferably at most 18% by weight. When the amount exceeds 20% by weight, BR(a) is hardly dispersed in the rubber composition and processability is deteriorated.

The amount of BR(a) in the rubber components is at least 20% by weight and preferably at least 30% by weight. When the amount is less than 20% by weight, cut resistance and crack growth resistance become inferior. Also, the amount of BR(a) is at most 60% by weight and preferably at most 50% by weight. When the amount exceeds 60% by weight, tensile fracture properties of the rubber composition become inferior, which causes the decrease of the amount of BR(b) in the rubber composition, and tan δ is increased.

The tin-modified polybutadiene rubber (b) (BR(b)) is obtained by polymerizing 1,3-butadiene by a lithium initiator and thereafter adding a tin compound, and further, the end of a BR(b) molecule is preferably bonded with a tin-carbon bond.

An example of a lithium initiator is a lithium compound such as alkyl lithium, aryl lithium, allyl lithium, vinyl lithium, organic tin lithium and organic nitrogen lithium. BR(b) with high vinyl and low cis content can be prepared by using a lithium compound as an initiator for BR(b).

Examples pf a tin compound are tin tetrachloride, butyltin trichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin di-stearate, tetraallyltin, p-tributyltin styrene, and among those, one kind or at least two kinds can be selected to be used.

The amount of a tin atom in BR(b) is at least 50 ppm and preferably at least 60 ppm. When the amount is less than 50 ppm, effects for promoting dispersion of carbon black in BR(b) is little and tan δ is increased. Also, the amount of a tin atom is at most 3000 ppm, preferably at most 2500 ppm and more preferably at most 250 ppm. When the amount exceeds 3000 ppm, cohesiveness (rubber fragments cohere together without scattering) of a kneaded product becomes poor and edges are not aligned; therefore, extrusion properties of the kneaded product are deteriorated.

Molecular weight distribution (Mw/Mn) of BR(b) is at most 2 and preferably at most 1.5. When Mw/Mn exceeds 2, dispersibility of carbon black is deteriorated and it is not preferable that tan δ is increased.

The amount of a vinyl bond in BR(b) is at least 5% by weight and preferably at least 7% by weight. When the amount of a vinyl bond is less than 5% by weight, it is difficult to polymerize (prepare) BR(b). Also, the amount of a vinyl bond is at most 50% by weight and preferably at most 20% by weight. When the amount of a vinyl bond exceeds 50% by weight, dispersibility of carbon black becomes inferior and tensile strength tends to be weak.

The amount of BR(b) in the rubber component is at least 5% by weight and preferably at least 10% by weight. When the amount is less than 5% by weight, effects of reducing tan δ can not be obtained sufficiently. Also, the amount of BR(b) is at most 80% by weight and preferably at most 40% by weight. When the amount exceeds 80% by weight, effects of reducing tan δ is not improved and the total amount of the rubber (c) and BR(a) becomes at most 20% by weight, thus, tensile strength and hardness are lowered.

The rubber (c) is a rubber other than BR(a) and BR(b). Specifically, examples are a natural rubber (NR), an isoprene rubber (IR), a styrene-butadiene rubber (SBR), a high cis-1, 4polybutadiene rubber other than BR(a) and BR(b). Among those, a natural rubber is preferable due to excellent tensile strength. Also, as the rubber (c), it is preferable to use in a combination of a natural rubber with an isoprene rubber, or that of a natural rubber with a high cis-1,4-polybutadiene rubber other than BR(a) and BR(b).

The amount of the rubber (c) in the rubber component is at least 10% by weight, preferably at least 20% by weight and more preferably at least 30% by weight. When the amount is less than 10% by weight, sufficient tensile strength and cut resistance properties can not be obtained. Also, the amount of BR(c) in the rubber components is at most 75% by weight and preferably at most 60% by weight. When the amount exceeds 75% by weight, the total amount of BR(a) and BR(b) becomes at most 25% by weight and reduction of tan δ and improvement in hardness cannot be achieved.

The rubber composition for a base tread of the present invention can contain, if necessary, fillers for reinforcement such as carbon black, silica, calcium carbonate and clay, a softening agent such as an aroma oil, a wax, an antioxidant, stearic acid, zinc oxide, a vulcanizing agent such as sulfur, and a vulcanization accelerator in addition to the above described rubber components. As a filler for reinforcement, carbon black is preferably used since problems of the present invention can be sufficiently solved.

The rubber composition for a base tread of the present invention is prepared as the rubber components combining BR(a), BR(b) and the rubber (c), and further, the amount of a filler for reinforcement is reduced to be 25 to 50 parts by weight based on 100 parts by weight of the rubber component; therefore, tan δ can be greatly lowered without lowering the hardness, stress and elongation at break of the rubber composition. In case of using carbon black as a filler for reinforcement, the amount of carbon black is preferably 30 to 45 parts by weight based on 100 parts by weight of the rubber component.

The rubber composition for a base tread of the present invention is prepared by compounding the rubber component and, if necessary, the above described various chemicals to be kneaded, the kneaded product is processed with extrusion, adjusting in a form of a base tread of a tire at a stage of unvulcanization to mold an unvulcanized tire in a tire molding machine and, further, the unvulcanized tire is heated and pressured in a vulcanization machine to obtain a tire.

EXAMPLES

The present invention is explained in details in Examples, but it is not limited only thereto.

Hereinafter, various chemicals used in Examples are described below.

Polymer A: VCR617 available from Ube Industries, Ltd. (a dispersion product of a 1,2-syndiotactic polybutadiene crystal, the amount of a 1,2-syndiotactic polybutadiene crystal: 17% by weight, the melting point of a 1,2-syndiotactic polybutadiene crystal: 200° C., the amount of a portion insoluble in boiling n-hexane: 15 to 18% by weight)

Polymer B: BR1250 available from Nippon Zeon Co., Ltd. (polymerization by using lithium as an initiator, the amount of a vinyl bond: 10 to 13% by weight, Mw/Mn: 1.5, the amount of a tin atom: 250 ppm, the amount of a component having at most $10^5$ of polystyrene-converted molecular weight: 2 to 3% by weight).

Natural rubber: RSS#3

1,4 High cis-BR: BR150B available from Ube Industries, Ltd.

Carbon black: SHOUBLACK (N330) available from SHOWA CABOT K.K.

Aroma oil: DIANA PROCESS AH-24 available from Idemitsu Kosan Co., Ltd.

Wax: SUNNOC, available from OUCHISHINKO CHEMICAL INDUSTRIAL CO., LTD.

Antioxidant: NOCRAC 6C available from OUCHISHINKO CHEMICAL INDUSTRIAL CO., LTD.

Stearic acid: Stearic acid available from NOF Corporation

Zinc oxide: Zinc oxide No. 1 available from Mitsui Mining And Smelting Co., Ltd.

Sulfur: Sulfur powder available from Karuizawa Iou Kabushikikaisha

Vulcanization accelerator: NOCCELER NS available from OUCHISHINKO CHEMICAL INDUSTRIAL CO., LTD.

Examples 1 to 5 and Comparative Examples 1 to 8

(Preparation of Rubber Samples)

Various chemicals such as a polymer other than a vulcanizing filler such as sulfur and a vulcanization accelerator were kneaded in a BR Banbury according to the composition content of Table 1 and, then, thereto were added the vulcanization filler and kneaded by a 8-inch roll to obtain an unvulcanized rubber composition. The unvulcanized rubber composition was molded by vulcanizing at 170° C. and at a pressure of 25 kgf/cm$^2$ for 12 minutes to prepare a rubber sample. Measurements below were conducted by using the obtained rubber sample.

(Rubber Hardness (Hs))

Hardness of a prepared test piece was measured by using a JIS-A hardness tester.

(Tan δ)

With respect to tan δ, a loss coefficient tan δ was measured at 70° C. and a frequency of 10 Hz under conditions of an initial strain of 10% and a dynamic strain of 2% by using a viscoelasticity spectrometer made by Iwamoto Seisakusyo Co., Ltd. The smaller the figure is, the more excellent rolling resistance is, and exothermic heat of a tire can be suppressed.

(Cut Resistance)

A scratch was given on a test piece by using a steel blade steel of a width of 20 mm of an impact pendulum machine of a cut resistance index, and indexation of the depth of the scratch was conducted respectively, regarding the depth of the scratch of Example 2 as 100. The larger the index is, the more excellent cut resistance is.

(Crack Growth Resistance)

The length of a crack was measured when the test piece was bent 120,000 times in accordance with the bending test of JIS-K6301. The indexation of the length of the scratch was conducted respectively, regarding the length of the scratch of Example 1 as 100. The larger the index is, the more superior the crack growth resistance is.

TABLE 1

|  | Ex. | | | | | Com. Ex. | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| Composition (part by weight) | | | | | | | | | | | | | |
| Polymer A | 30 | 20 | 30 | 30 | 50 | 50 | — | — | 50 | — | 50 | 10 | 26 |
| Polymer B | 20 | 30 | 30 | 50 | 30 | — | 50 | — | 50 | 50 | — | 40 | 4 |
| Natural rubber | 50 | 50 | 40 | 20 | 20 | 50 | 50 | 50 | — | — | — | 50 | 70 |
| 1,4 high cis-BR | — | — | — | — | — | — | — | 50 | — | 50 | 50 | — | — |
| Carbon black | 35 | 35 | 35 | 35 | 35 | 35 | 35 | 35 | 35 | 35 | 35 | 35 | 35 |
| Aroma oil | 7 | 7 | 7 | 7 | 7 | 7 | 7 | 7 | 7 | 7 | 7 | 7 | 7 |
| Wax | 1 | 1 | 1 | 1 | 1 | 1 | 1 | 1 | 1 | 1 | 1 | 1 | 1 |
| Antioxidant | 1.5 | 1.5 | 1.5 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 | 3 |
| Sulfur | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| Evaluation results | | | | | | | | | | | | | |
| Hs | 57 | 55 | 57 | 57 | 60 | 60 | 50 | 50 | 59 | 49 | 60 | 51 | 55 |
| tanδ | 0.090 | 0.080 | 0.078 | 0.080 | 0.082 | 0.140 | 0.080 | 0.135 | 0.081 | 0.079 | 0.135 | 0.080 | 0.130 |
| Cut resistance | 105 | 100 | 95 | 90 | 85 | 110 | 70 | 70 | 60 | 50 | 70 | 90 | 120 |
| Crack growth resistance | 100 | 90 | 105 | 110 | 160 | 120 | 60 | 120 | 160 | 130 | 140 | 50 | 80 |

According to the present invention, there can be provided a rubber composition for a base tread improving steering stability and rolling resistance properties by using (a) a polybutadiene rubber containing a 1,2-syndiotactic polybutadiene crystal, (b) a tin-modified polybutadiene rubber, and (c) a rubber other than (a) and (b) as a rubber component, and a tire comprising the same.

What is claimed is:

1. A rubber composition for a base tread comprising a rubber component containing
   (a) 20 to 60% by weight of a polybutadiene rubber containing 2.5 to 20% by weight of a 1,2-syndiotactic polybutadiene crystal,
   (b) 5 to 80% by weight of a tin-modified polybutadiene rubber polymerized with a lithium initiator, wherein the amount of a tin atom is 50 to 3000 ppm, the amount of a vinyl bond is 5 to 50% by weight and molecular weight distribution (Mw/Mn) is at most 2, and
   (c) 10 to 75% by weight of a rubber other than (a) and (b).

2. A tire having a base tread comprising the rubber composition of claim 1.

3. The rubber composition of claim 1 wherein the melting point of the 1,2-syndiotactic polybutadiene crystal is 180 to 220°.

4. The rubber composition of claim 1, wherein, in the tin-modified polybutadiene rubber, the tin atom is chemically bonded with the polybutadiene rubber.

* * * * *